US006599649B2

(12) United States Patent
Martin

(10) Patent No.: US 6,599,649 B2
(45) Date of Patent: Jul. 29, 2003

(54) UNIVERSAL INTERFACING ATTACHMENT SYSTEM FOR CAMOUFLAGE SCREENS

(75) Inventor: Robert W. Martin, Lillington, NC (US)

(73) Assignee: Saab Barracuda AB, Gamleby (SE)

( * ) Notice: Subject to any disclaimer, the term of this patent is extended or adjusted under 35 U.S.C. 154(b) by 3 days.

(21) Appl. No.: 10/007,251

(22) Filed: Nov. 13, 2001

(65) Prior Publication Data

US 2003/0070772 A1 Apr. 17, 2003

Related U.S. Application Data

(60) Provisional application No. 60/328,999, filed on Oct. 12, 2001.

(51) Int. Cl.$^7$ ................................................. F41H 3/03
(52) U.S. Cl. ............................. 428/919; 52/3; 52/581; 52/582.1; 135/119; 135/913; 150/154; 160/368.1
(58) Field of Search ........................... 428/919; 52/3–5, 52/581, 582.1; 43/7, 14; 134/119, 913; 24/DIG. 37, 713.4; 403/363, 376, 378, 380, 379.5; 160/229.1, 231.1, 368.1, 351, 354; 150/154

(56) References Cited

U.S. PATENT DOCUMENTS

| | | | |
|---|---|---|---|
| 2,455,237 A | * | 11/1948 | Davis |
| 3,442,275 A | * | 5/1969 | Ternes |
| 3,661,689 A | | 5/1972 | Spanier |
| 4,065,835 A | * | 1/1978 | Yoneya |
| 4,436,779 A | | 3/1984 | Menconi et al. |
| 4,526,347 A | | 7/1985 | McLoughlin |
| 4,644,679 A | | 2/1987 | Ban |
| 4,930,286 A | | 6/1990 | Kotler |
| 5,121,566 A | | 6/1992 | Barclay |
| 5,209,005 A | | 5/1993 | Krager |

FOREIGN PATENT DOCUMENTS

| | | | | |
|---|---|---|---|---|
| FR | 2549594 | * | 1/1985 | ............. F41H/3/03 |
| FR | 2620626 | * | 3/1989 | ........... A62B/29/00 |

OTHER PUBLICATIONS

LCSS Instruction Manual diagram–LCSS screen No Date.
ULCANS Instruction Manual diagram–ULCANS screen No Date.
http://155.217.58.58/cgi–bin/atdl.dll/fm/20–3/appc.htm Appendix C Camouflage Requirements and Procedures, 6 pages.*
http://www.dtic.mil/armylink/news/Feb1999/a19990204netting.html New camouflage system lighter, increases survivability,2 pages.*
http://www.fbodaily.com/cbd/archive/2001/08(August)/09–Aug–2001/asol024.htm A—Ultra lightweight camouflage net system (ULCANS), 2 pages.*

* cited by examiner

Primary Examiner—Robert Canfield
(74) Attorney, Agent, or Firm—Locke Liddell & Sapp LLP

(57) ABSTRACT

The present invention provides an attachment system that can be used to interface between dissimilar camouflage systems and is particularly useful with ULCANS and LCSS camouflage systems. The present invention provides such compatibility while simultaneously maintaining quick disconnect capabilities with either system.

12 Claims, 5 Drawing Sheets

UNIVERSAL INTERFACING ATTACHMENT SYSTEM FOR CAMOUFLAGE SCREENS

This application claims the benefit of U.S. Provisional Application Serial No. 60/328,999, filed Oct. 12, 2001.

FIELD OF THE INVENTION

The present invention relates to the coupling of two or more attachment systems. More particularly, the present invention relates to the attachment of two or more dissimilar quick disconnect systems for camouflage units.

BACKGROUND OF THE INVENTION

Camouflage has long been recognized as a practical and efficient way of concealing the location of people and equipment. Camouflage generally seeks to duplicate surrounding environments to avoid visual and/or other sensory detection. Significant amounts of camouflage are used in military operations. For example, large equipment such as tanks, aircraft, ships, and other equipment frequently are painted or otherwise coated with a camouflage appearance. A covering spread over the equipment can make additional camouflage protection.

The camouflage covering can be used to cover even large pieces of equipment and troop placements by linking two or more camouflage units, or screens, together. For example, aircraft, ships, and other large equipment can use several camouflage screens to cover at least a portion of the equipment. It is advantageous to have a "quick disconnect" coupling system to allow the screens to be quickly coupled when setting up the screens and quickly uncoupled upon removal. The success of a mission and protection of lives can depend on the quick covering and removal of the screens.

One camouflage system known to those in military environments is termed "lightweight camouflage screening system" (LCSS). The LCSS was originally fielded in the mid-1970's. Generally, the LCSS employs a system of plastic brackets and pins surrounding the perimeter of a screen to attach one camouflage screen to another. A bracket from a first screen engages a bracket from a second screen and a pin is inserted through both brackets to hold the brackets together. Multiple pins are connected by a lanyard. To quickly release the LCSS system screens, a person can pull the lanyard, thereby disengaging multiple pins from the associated LCSS brackets and the camouflage screens can be separated quickly.

One difficulty with the LCSS system is that the brackets can scratch sensitive equipment, such as aircraft. Thus, a new generation of camouflage units was developed.

The new generation of camouflage units is known as the "ultra lightweight camouflage net system" (ULCANS). The ULCANS system was developed to completely replace the LCSS. The ULCANS system employs a "becket" loop system to lace one camouflage unit to another. The becket loops are disposed around the unit's perimeter.

In general, the ULCANS system includes short becket loops formed on the screen periphery in alternating fashion with long becket loops. Two ULCANS camouflage units are placed adjacent one another. The long becket loop from a first screen is inserted through a short becket loop of a second screen. Then, a long becket loop on the second screen is inserted through the first long loop on the first screen. The long becket loop on the second screen is inserted through a second short becket loop on the first screen. Generally, this intertwining continues until the edges of the screens are reached at which point the becket loop is tied off. Untying the knotted becket and pulling the units away from each other causes a quick unraveling of the becket loops. Thus, there are no hard plastic brackets as in the LCSS system. The ULCANS system has been officially approved for use in this fashion by the military and perhaps other entities. Further, the ULCANS system provides increased shielding over the LCSS system of other output, such as infrared radiation, to avoid detection.

Despite the apparent advantage of the ULCANS system and the desired use, the ULCANS system has not fully replaced the LCSS system. The cutbacks in defense spending and other programs have caused the full implementation of the ULCANS system to be delayed. As a practical and realistic intermediate plan, it has been desired that the ULCANS system be fielded with the older LCSS system. The only method currently available in the field to attach the two different unit systems is to use cable ties or the LCSS pin-to-lanyard cord to secure the two dissimilar systems together. Neither of these approaches allow for the quick disconnect procedure that is so important in the field. While the need is apparent, the solution has not been so apparent.

Thus, there remains a need for an improved system that allows the ULCANS system to be used in combination with the LCSS system while maintaining the quick disconnect capability.

SUMMARY OF THE INVENTION

The present invention provides an attachment system that can be used to interface between dissimilar camouflage systems and is particularly useful with ULCANS and LCSS camouflage systems. The present invention provides such compatibility while simultaneously maintaining quick disconnect capabilities with either system.

The present invention provides a camouflage screen system, comprising at least one interfacing modular attachment unit adapted to connect to two or more camouflage screens, the attachment unit having connectors compatible with both the ULCANS connection system and the LCSS connection system, the connectors comprising a first becket loop, a second becket loop, and an additional connector unit whereby said first becket loop and said second becket loop are sufficient to establish quickly releasable interlock with an opposing ULCANS compatible unit, said additional connector unit comprises an LCSS compatible attachment bracket, and said connector unit is sufficient to establish quickly releasable interlock with an opposing LCSS compatible unit. Further, the modular attachment unit comprises an interface between an ULCANS screen module and an LCSS screen module and the becket loops are disposed on one side of the modular attachment unit and the connector unit is disposed on another side of the modular attachment unit, and the modular attachment unit is adapted to couple an ULCANS screen module to the becket loops disposed on the one side of the modular attachment unit and adapted to couple an LCSS screen module to the connector unit disposed on the other side of the modular attachment unit.

BRIEF DESCRIPTION OF THE DRAWINGS

A more particular description of the invention, briefly summarized above, may be realized by reference to the embodiments thereof that are illustrated in the appended drawings and described herein. However, it is to be noted that the appended drawings illustrate only some embodiments of the invention. Therefore, the drawings are therefore not to be considered limiting of its scope, for the invention may admit to other equally effective embodiments.

DETAILED DESCRIPTION OF THE INVENTION

Figure 1:
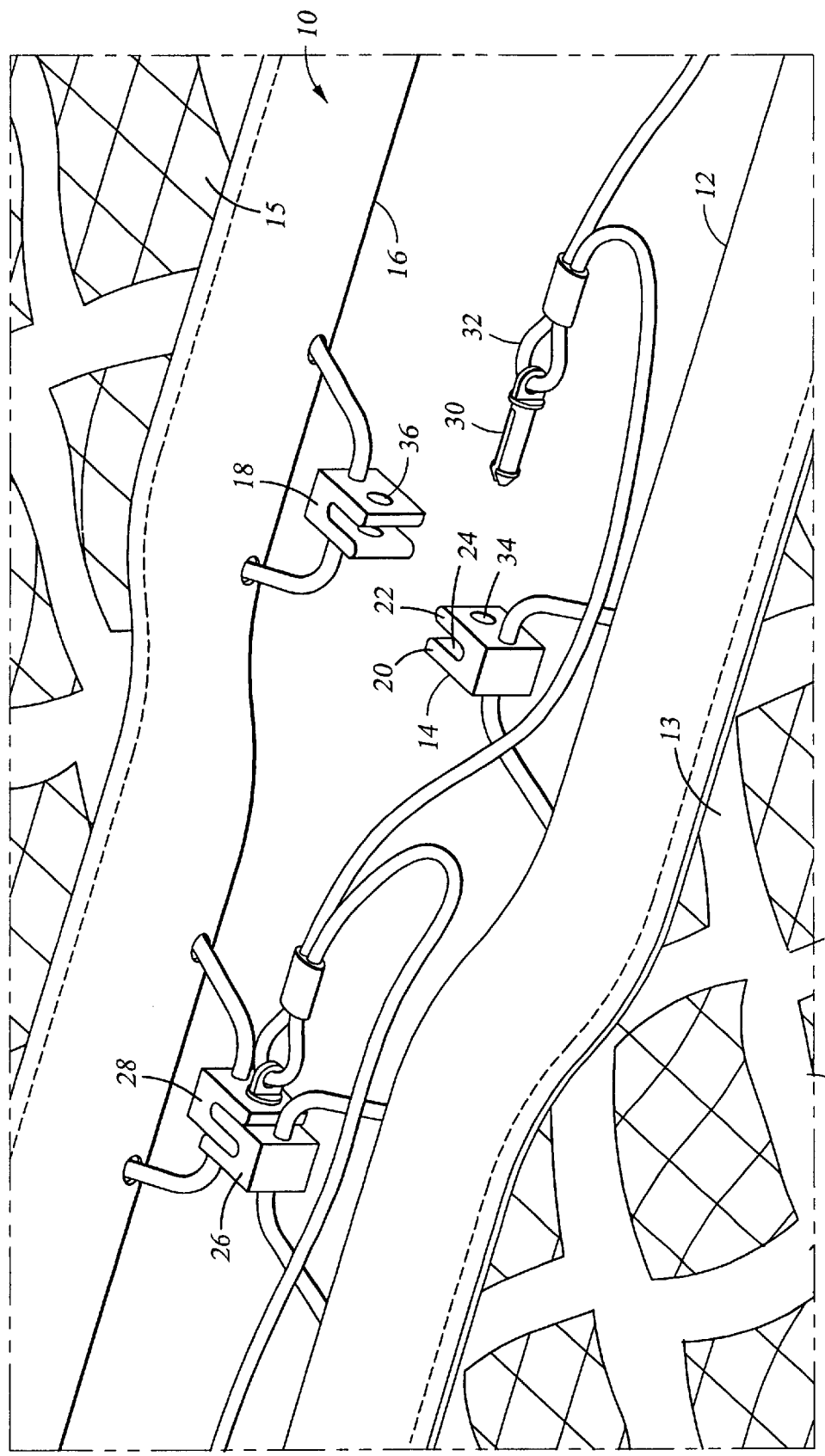
FIG. 1 is a schematic perspective view of an LCSS system.

FIG. 1 is a schematic perspective view of an LCSS system 10. A first LCSS screen module 12 includes a camouflage netting 13 and one or more LCSS brackets coupled to at least a portion of the netting periphery. For example, a plurality of first LCSS brackets 14, 26 are disposed on an outer periphery of the first LCSS screen module 12. A second LCSS screen module 16 includes netting 15 and a plurality of second LCSS brackets 18, 28. The first and second LCSS screen modules and respective LCSS brackets can be disposed adjacent each other in an opposing fashion for coupling thereto. The term "coupling" is used broadly herein and is intended to include any method of securing, fastening, attaching, joining, inserting, binding, bonding, or otherwise associating one or more members together.

The LCSS bracket 14 includes a first extension 20 and a second extension 22 with a recess 24 formed therebetween. The second LCSS bracket 18 includes a similar structure. The structure of the LCSS bracket is formed to allow the mating of two corresponding LCSS brackets that are generally identical to each other for ease of assembly. For example, two LCSS brackets 26, 28 are shown coupled to each other. The LCSS brackets are coupled together by offsetting one bracket from the other, so that the extension of one bracket is disposed in the recess of the other bracket.

The LCSS brackets include openings sized to allow a pin 30 to be inserted therethrough. A first LCSS bracket 14 includes a first opening 34 and the second LCSS bracket includes a second opening 36. When the first and second LCSS brackets are coupled together, the first and second openings 34, 36 are aligned to allow the pin 30 to be inserted therethrough. The pin 30 is shown inserted through the coupled LCSS brackets 26, 28.

The first and second brackets 14, 18 can be decoupled by simply pulling the pin 30 from the coupled brackets. Advantageously, a plurality of pins can be coupled to the cord 32 and inserted in a same direction into a plurality of brackets. By pulling the cord 32, multiple pins can be pulled from multiple brackets, thus, forming a quick release system. The interface of the LCSS system with the universal attachment system is described in reference to FIGS. 3 and 4.

Figure 2:
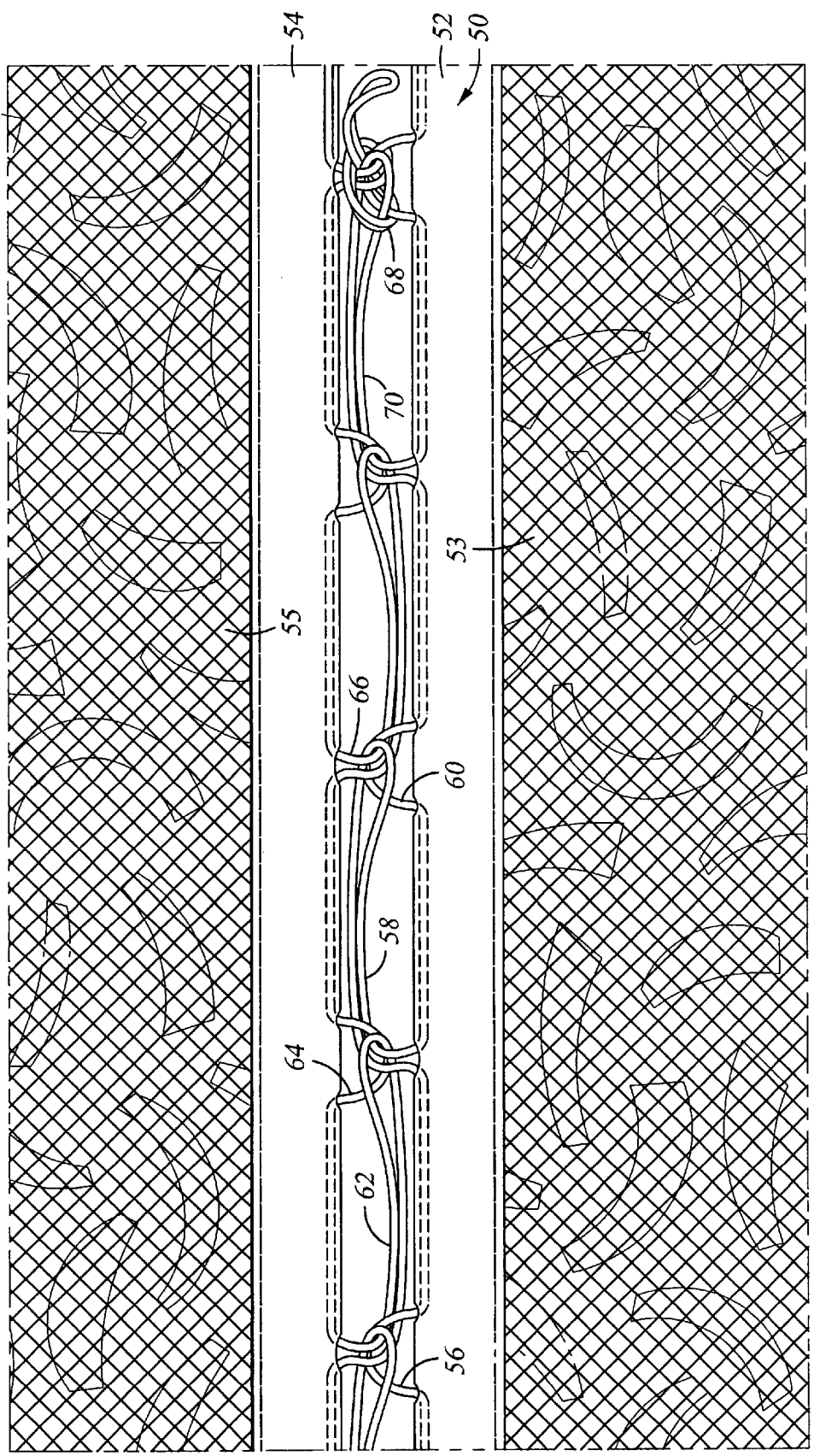
FIG. 2 is a schematic perspective view of the ULCANS system.

FIG. 2 is a schematic perspective view of the ULCANS system 50. The ULCANS system 50 is also designed to allow quick release of a plurality of screen modules. For example, a first ULCANS screen module 52 includes a netting 53 and a plurality of becket loops coupled to at least a portion of the netting periphery. The netting 53 on the ULCANS system has a pattern generally distinct from the netting pattern on the LCSS system. Becket loops are known in the industry and generally include a looped cord, large hook and eye, grommet, or other elements for securing items.

The first ULCANS screen module 52 includes a plurality of becket loops, such as a first becket loop 56, a second becket loop 58, and a third becket loop 60. In at least one embodiment, the becket loops alternate in lengths such that the first becket loop 56 can be a short becket loop, the second becket loop 58 can be a long becket loop, and the third becket loop 60 can be a short becket loop. For example and without limitation, the first becket loop can be about one inch long and the second becket loop can be about eight inches long. Also, for example and without limitation, the loops can be spaced approximately eight inches from each other, so that the pattern repeats about every sixteen inches around at least a portion of the screen module periphery.

A second ULCANS screen module 54 having netting 55 can be disposed adjacent the first ULCANS screen module 52. The second ULCANS screen module 54 can include a netting 55 and a corresponding set of becket loops coupled to the netting 55. The becket loops on the second ULCANS screen module are adapted to be coupled with the becket loops on the first ULCANS screen module. For example, a first becket loop 62, which can be long, can be disposed adjacent the first becket loop 56, which can be short, on the first ULCANS screen module 52. Similarly, a second becket loop 64, which can be short, on the second ULCANS screen module 54 can be disposed adjacent the second becket loop 58, which can be long, on the first ULCANS screen module 52. A third becket loop 66 on the second ULCANS screen module 54 can be disposed adjacent a corresponding becket loop 60 on the first ULCANS screen module 52 and so forth in corresponding fashion.

For attachment, generally a long loop from one module is inserted through a short loop in the second module. Then, a long loop from the second module is inserted through the long loop of the first module. Then, the long loop of the second module is inserted through the short loop of the first module, and continuing thereon until an end of the portion to be secured is reached, where the end is tied or secured.

For example, the long first becket loop 62 from the second ULCANS screen module 54 can be inserted through the short first becket loop 56 of the first ULCANS screen module 52. Then, the long second becket loop 58 of the first ULCANS screen module 52 can be inserted through the long first becket loop 62 of the second ULCANS screen module 54. The long second becket loop 58 can then be inserted through the short second becket loop 64 of the second ULCANS screen module 54. The third becket loop 66 of the second ULCANS screen module 54 can then be inserted through the second becket loop 58 of the first ULCANS screen module 52. The arrangement can continue in like fashion using alternating loops. At the end 68, the last loop can be tied, pinned, or otherwise secured to resist unraveling. For disassembly, the secured end 68 can be untied or otherwise uncoupled. The screen modules can be pulled apart and the loops can naturally disengage from each other.

Figure 3:
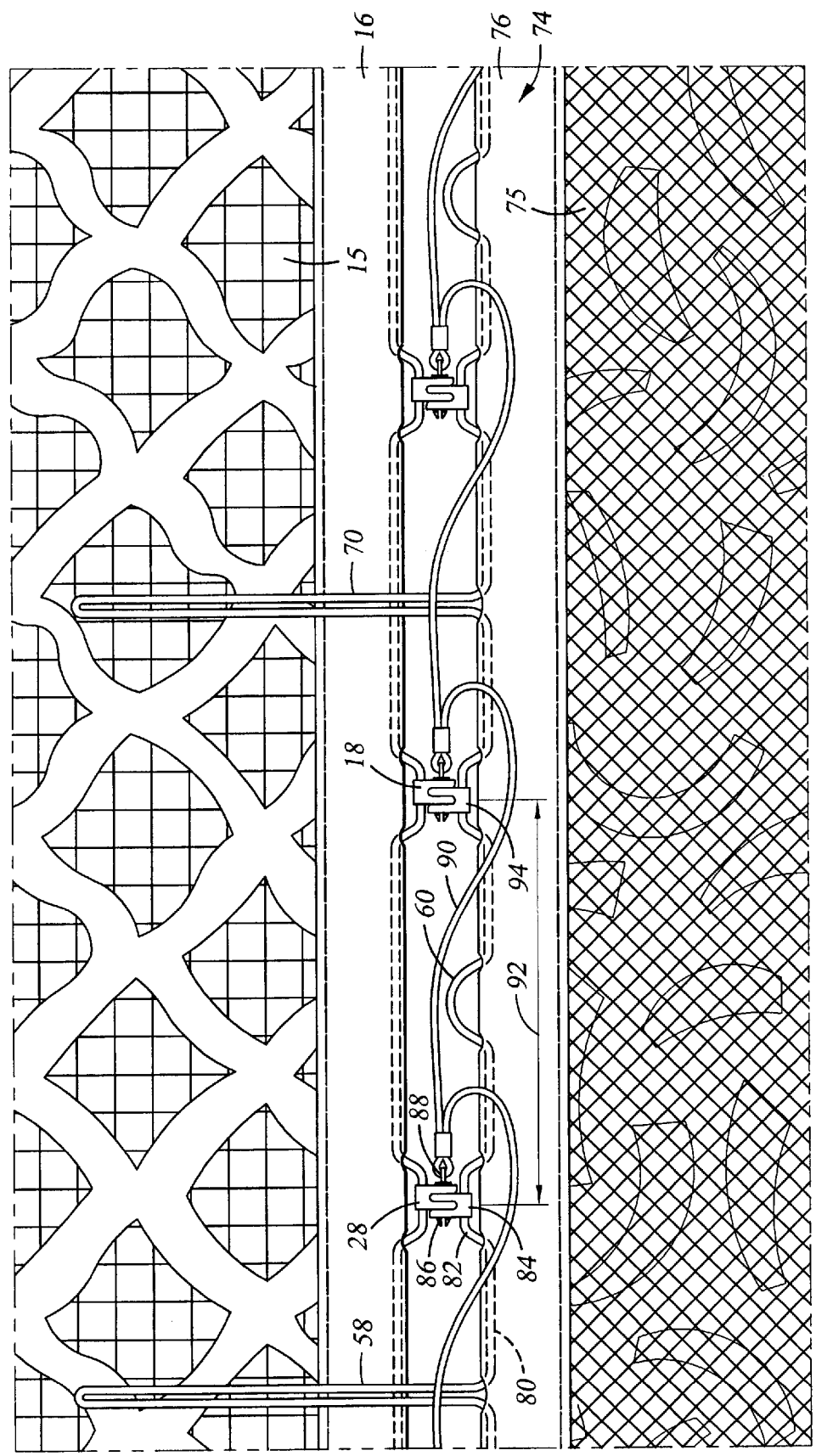
FIG. 3 is a schematic perspective view of a universal attachment system for ULCAN and LCSS systems.

FIG. 3 is a schematic perspective view of one embodiment of a universal attachment system 74 for ULCANS and LCSS systems. The ULCANS/LCSS attachment system 74 can include at least one modular attachment unit 76 having a netting 75 in at least one embodiment. The netting 75 can have a similar material and design as the ULCANS screen module netting 53, shown in FIG. 2.

The modular attachment unit 76 can include a plurality of loops and connector units coupled to at least a portion of the netting periphery. The modular attachment unit 76 can include a long becket loop 58, a short becket loop 60, a long becket loop 70, and so forth, repeating in like fashion, such as described in FIG. 2. A cord or other material 80 can be used to form the becket loops and to support the LCSS brackets on the universal attachment system 76. Alternatively, the various becket loops can be formed using separate material that can be tied or otherwise coupled to the material 80.

A first attachment member 82 can be coupled to the material 80 and one or more connector units. In some embodiments, the attachment member 82 may be integrated with the material 80, such as by using a common cord, and the two members could be merged as one member. Thus, the first attachment member 82 can include a loop of the material 80 that can also used to form the becket loops 58, 60, 70, and other loops. In other embodiments, the first attachment member 82 can be a separate member that is coupled to the material 80.

A first connector unit 84 can be coupled to the first attachment member 82. In at least one embodiment, the first attachment member 82 can allow the first connector unit 84 to extend a distance from the edge of the modular attachment unit 76. Generally, the distance corresponds to a similar distance that the LCSS bracket 28 extends from the edge of the LCSS screen module 16.

In at least one embodiment, the connector unit 84 is the same or similar as the LCSS brackets, 14, 18, 26, and 28, described in reference to FIG. 1. Thus, the connector unit can comprise a first and second extension with a recess formed therebetween. However, the shape of the connector unit 84 can vary, as long as the shape allows the connector unit 84 to maintain its ability to be coupled to an LCSS bracket. The connector unit 84 further includes an opening 86 corresponding to the openings 34, 36 in the LCSS brackets, shown in FIG. 1.

A coupler 88 can be used to couple the connector unit and corresponding LCSS bracket together. In at least one embodiment, the coupler 88 can comprise a pin, such as the pin 30, described in FIG. 1. The coupler 88 can be inserted through the connector unit 84 and corresponding LCSS bracket when the connector unit and bracket are aligned. The coupler 88 can be attached to a member 90, such as a cord, to facilitate removal, similar to the pin and cord arrangement described in FIG. 1.

The connector unit 84 is generally disposed between the becket loops, such as between becket loops 58 and 60 and between becket loops 60 and 70. It is advantageous to have a spacing 92 between the first connector unit 84 and an adjacent connector unit 94 that corresponds to a spacing between LCSS screen module brackets, such as the brackets on the LCSS screen module 16. Although the spacing can vary, a spacing 92 of about eight inches corresponds to the LCSS bracket spacing.

Thus, the ULCANS/LCSS universal attachment system 74 can include a modular attachment unit 76 having loops, connector units, and a netting in at least one embodiment that can be coupled with either the ULCANS system 50 or the LCSS system 10, described in FIGS. 1 and 2. When using an ULCANS system, the modular attachment unit 76 can be disposed adjacent an ULCANS screen module, such as screen module 54, described in reference to FIG. 2. The alternating long and short becket loops can be intertwined to couple the members together and at least one of the becket loops tied or otherwise secured, as described above. The connector unit 84 can remain uncoupled to the ULCANS screen module. For quick release, the becket loops can be disengaged as described above and the modular attachment unit 76 can be separated from the ULCANS screen module 54.

When using an LCSS system, the modular attachment unit 76 can be positioned adjacent an LCSS screen module, such as screen module 16, also shown in FIG. 1. Brackets 18, 28 can be disposed adjacent the connector units 84, 94. The connector units and brackets can be coupled using the coupler 88, such as a pin. The becket loops 58, 60, 70, can be left uncoupled from the LCSS screen module. For quick release, the coupler 88 can be pulled from the connector units coupled with the LCSS brackets. Thus, the modular attachment unit 76 can be used with either system.

Further, the present invention provides for a retrofit of an existing ULCANS screen module, such as the screen module 54, described in reference to FIG. 2. A connector unit 84 can be provided with or without an attachment member 82. The connector unit 84 can be coupled to an ULCANS screen module, such as to the material 80, at an appropriate position. Other connecting units can be similarly coupled at an appropriate spacing to the ULCANS screen module. In at least one embodiment, the first attachment member 82 can be a cord that can be tied to the material 80. Thus, the connector unit and the ULCANS screen module can be used to create the modular attachment unit 76.

Figure 4:
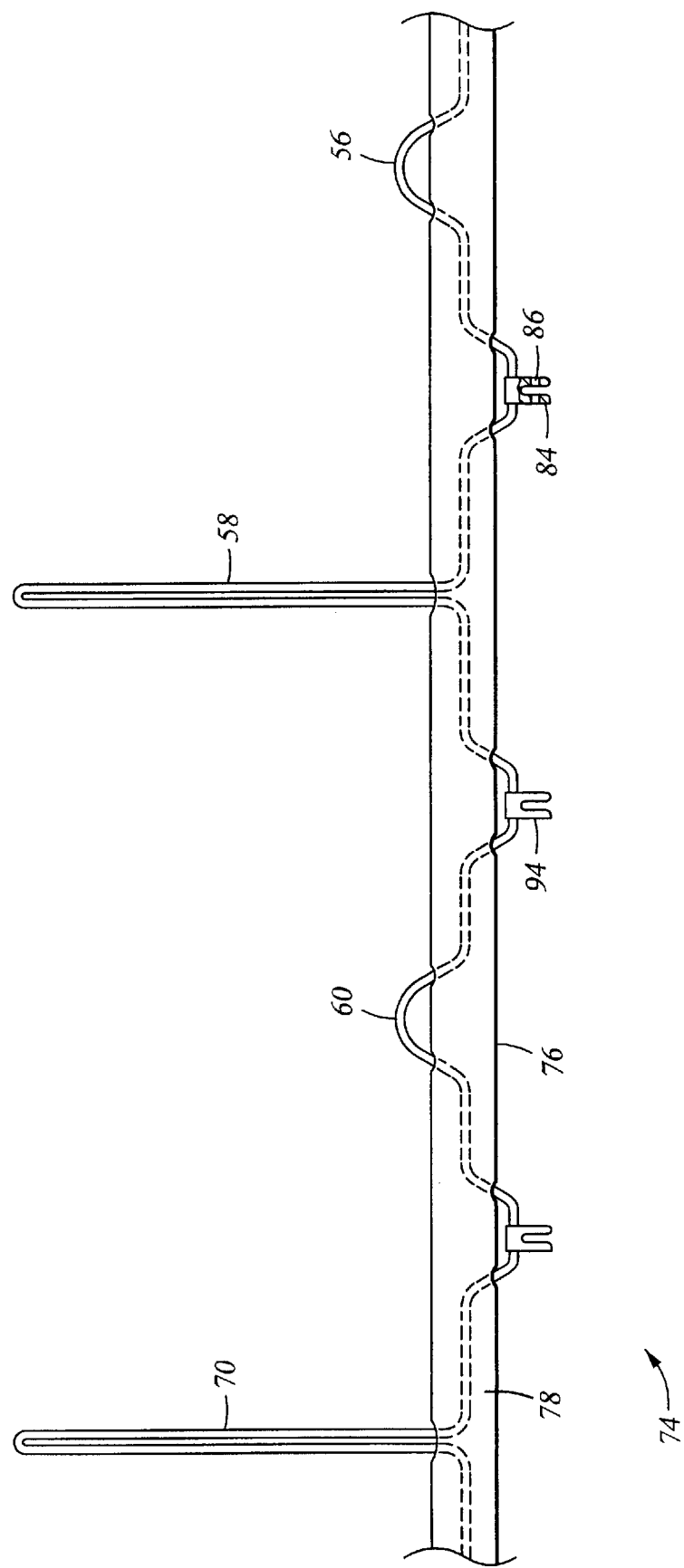
FIG. 4 is a schematic view of another embodiment of the ULCANS/LCSS modular attachment system.

FIG. 4 is a schematic view of another embodiment of the ULCANS/LCSS modular attachment system 74. The elements are similarly numbered as shown in FIG. 3. The modular attachment system 74 can comprise a modular attachment unit 76 that is a separate interface. The interfacing attachment unit 76 has a material 78, such as a strap, ULCANS compatible becket loops extending from one side of the material 78, and LCSS compatible connection units extending from the other side of the material 78. For example, the attachment unit 76 can include a long becket loop 58, a short becket loop 60, a long becket loop 70, and other loops on at least one side, compatible with an ULCANS screen module. The modular attachment system 74 can include connector units 84, 94 on at least another side, compatible with an LCSS screen module.

Figure 5:
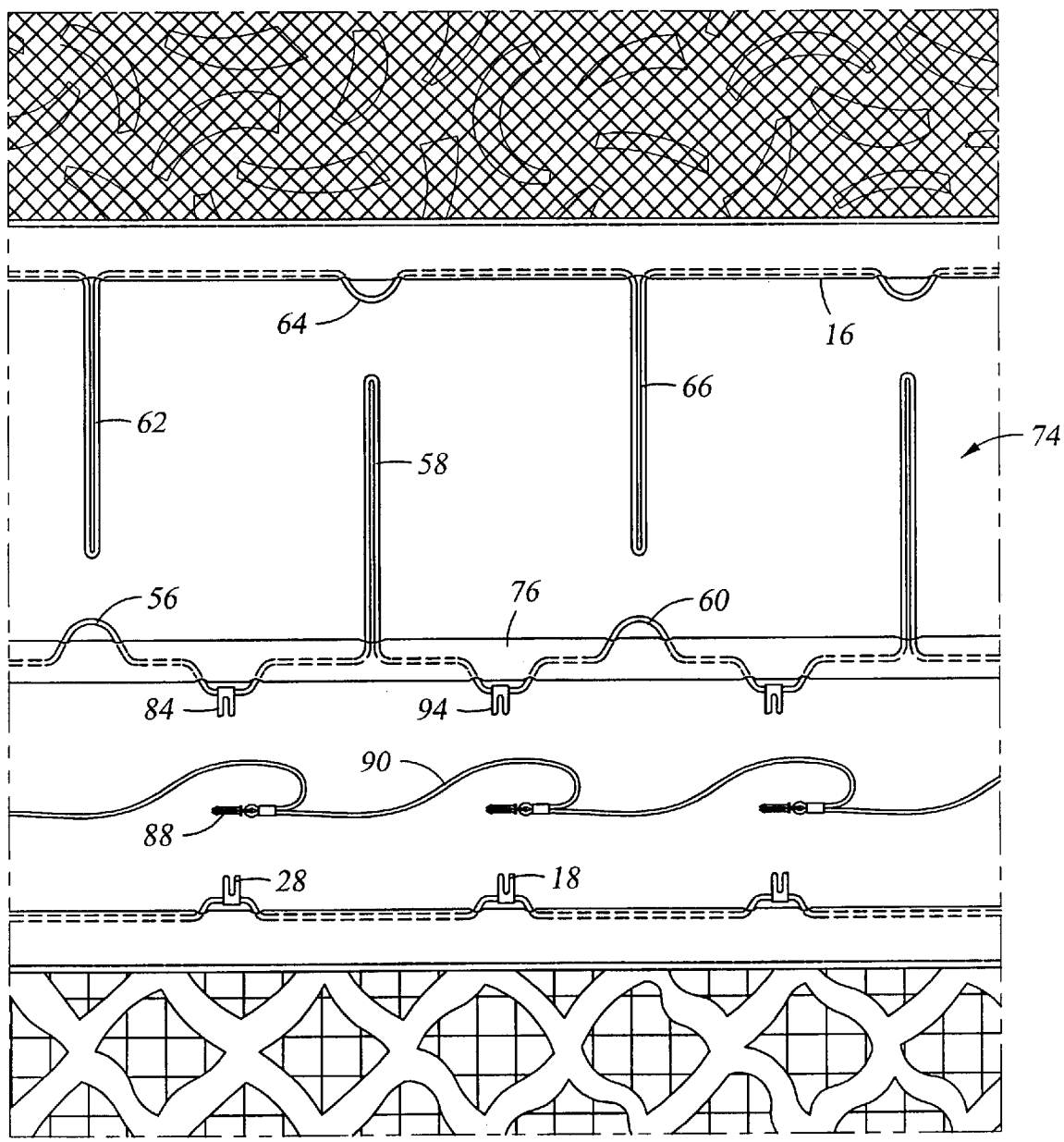
FIG. 5 is a schematic perspective view of one embodiment of the ULCANS/LCSS modular attachment system in use.

FIG. 5 is a schematic perspective view of one embodiment of the ULCANS/LCSS modular attachment system 74 in use. The elements are similarly numbered as shown in FIGS. 3 and 4.

In operation, an ULCANS screen module, such as module 54, can be coupled to one side of the interfacing modular attachment unit 76. The alternating long and short becket loops, such as loops 62, 64, and 66 of the module 54, can be intertwined with corresponding loops 56, 58, and 60 of the attachment unit 76 to couple the members together. At least one of the becket loops is tied or otherwise secured, as described in reference to FIG. 2.

AN LCSS screen module, such as module 16, can be coupled to another side of the interfacing modular attachment unit 76. The modular attachment unit 76 is coupled to the LCSS screen module 16 by coupling the connector unit 84 with the LCSS bracket 28, connector unit 94 with the LCSS bracket 18, and so forth. The coupler 88 is inserted in the connector unit 84 and LCSS bracket 28 and other pairs of connector units and LCSS brackets to couple the members together.

Thus, the ULCANS attachment system 74 provides a compatibility simultaneously with both the ULCANS and LCSS systems, while maintaining a quick release interlock with each system. The embodiment of the modular attachment unit described in reference to FIGS. 4 and 5 can be sent to the field and used with existing ULCANS and LCSS screen modules.

While the foregoing is directed to various embodiments of the present invention, other and further embodiments can be devised without departing from the basic scope thereof. For example, the various methods and embodiments of the invention can be included in combination with each other to produce variations of the disclosed methods and embodiments. Discussion of singular elements can include plural elements and vice-versa. Also, any directions shown or described such as "top," "bottom," "left," "right," "upper," "lower," and other directions and orientations are described herein for clarity in reference to the figures and are not to be limiting of the actual device or system or use of the device or system. The device or system can be used in a number of directions and orientations. Further, the order of steps can occur in a variety of sequences unless otherwise specifically limited. The various steps described herein can be combined with other steps, interlineated with the stated steps, and/or split into multiple steps. Additionally, any headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention(s). However, to the extent statements might be considered inconsistent with the patenting of the invention (s), such statements are expressly not meant to be considered as made by the Applicants.

What is claimed is:

1. A camouflage screen system, comprising:
    at least one interfacing modular attachment unit adapted to connect to two or more camouflage screens, the attachment unit having connectors compatible with both the ULCANS connection system and the LCSS connection system, the connectors comprising:
    a first becket loop, a second becket loop, and an additional connector unit whereby:
        said first becket loop and said second becket loop are sufficient to establish quickly releasable interlock with an opposing ULCANS compatible unit;
        said additional connector unit comprises an LCSS compatible attachment bracket; and
        said connector unit is sufficient to establish quickly releasable interlock with an opposing LCSS compatible unit,
    the modular attachment unit comprising an interface between an ULCANS screen module and an LCSS screen module and wherein the becket loops are disposed on one side of the modular attachment unit and the connector unit is disposed on another side of the modular attachment unit and the modular attachment unit is adapted to couple an ULCANS screen module to the becket loops disposed on the one side of the modular attachment unit and adapted to couple an LCSS screen module to the connector unit disposed on the other side of the modular attachment unit.

2. The system of claim 1, wherein the connector unit comprises at least two extensions with a recess formed therebetween.

3. The system of claim 2, wherein the connector unit comprises an opening formed through the at least two extensions, the opening spaced to align with a corresponding opening in an LCSS bracket.

4. The system of claim 1, wherein the modular attachment unit comprises a screen module.

5. The system of claim 4, wherein the connectors extend on at least two sides of the screen module.

6. The system of claim 1, wherein at least one of the becket loops is longer than the other becket loop.

7. The system of claim 4, wherein the connector unit extends a distance from the modular attachment unit that corresponds to a distance that the LCSS bracket extends from the LCSS compatible unit.

8. The system of claim 3, further comprising a coupler that is adapted to be inserted into the opening in the connector unit.

9. The system of claim 8, further comprising a cord attached to a plurality of couplers and adapted to pull the plurality of couplers out of a plurality of openings formed in a plurality of connector units at substantially the same time.

10. The system of claim 1, further comprising an attachment member that is adapted to couple the connector unit to the modular attachment unit.

11. The system of claim 10, wherein the attachment unit is integral with material used to form one or more of the becket loops.

12. A camouflage screen system, comprising:
    at least one interfacing modular attachment unit having connectors simultaneously compatible with both the ULCANS connection system and the LCSS connection system, the connectors comprising:
    a first becket loop and a second becket loop shorter than the first becket loop disposed on one side of the interfacing modular attachment unit, whereby said first becket loop and said second becket loop are sufficient to establish quickly releasable interlock with an opposing ULCANS compatible unit; and
    an additional connector unit disposed on another side of the interfacing modular attachment unit and having at least two extensions with a recess formed therebetween and an opening formed through the extensions, the opening spaced to align with a corresponding opening in an LCSS bracket, whereby said additional connector unit comprises an LCSS, compatible attachment bracket and said connector unit is sufficient to establish quickly releasable interlock with an opposing LCSS compatible unit.

* * * * *